United States Patent
Kawashima

[15] 3,668,504
[45] June 6, 1972

[54] BATTERY CHARGING VOLTAGE REGULATOR INCLUDING SAFETY CIRCUIT

[72] Inventor: Yoshichi Kawashima, Gifu, Japan
[73] Assignee: Nippon Denso Company Limited, Kariya-shi, Japan
[22] Filed: Oct. 26, 1970
[21] Appl. No.: 83,766

Related U.S. Application Data

[63] Continuation-in-part of Ser. No. 61,814, Aug. 6, 1970, abandoned, which is a continuation of Ser. No. 783,201, Dec. 12, 1968, abandoned, and a continuation-in-part of Ser. No. 797,010, Feb. 6, 1969, abandoned.

[30] Foreign Application Priority Data

Dec. 16, 1967 Japan..................................42/80827
Feb. 10, 1968 Japan..................................43/8466

[52] U.S. Cl.............................320/64, 320/68, 322/28
[51] Int. Cl.............................................H02j 7/24
[58] Field of Search ...............317/31; 320/39, 40, 48, 64, 320/68; 322/28

[56] References Cited

UNITED STATES PATENTS 3,406,318 10/1968 Harland, Jr. et al........320/DIG. 1 UX
3,469,168 9/1969 Harland, Jr. et al........320/DIG. 1 UX
3,553,563 1/1971 Kawashima..............................320/48

*Primary Examiner*—A. D. Pellinen
*Attorney*—Cushman, Darby & Cushman

[57] ABSTRACT

A charging voltage regulator for a storage battery, in which, an output voltage of a charging generator is controlled to maintain the terminal voltage of a storage battery at a predetermined value by interrupting the field current of the generator using a transistor circuit, and especially if such accidents as electrical disconnections between the transistor circuit and the storage battery occur, all disasters caused by an extraordinary high voltage between terminals of the charging generator resulting from the occurrence of such accidents may be eliminated, so that the charging generator operates in the same manner as in the case where the connecting condition of the circuit is normal.

12 Claims, 4 Drawing Figures

PATENTED JUN 6 1972  3,668,504

INVENTOR
Yoshichi KAWASHIMA

BY Cushman, Darby & Cushman
ATTORNEYS

BATTERY CHARGING VOLTAGE REGULATOR INCLUDING SAFETY CIRCUIT

CROSS-REFERENCES TO RELATED APPLICATIONS

This application is a continuation-in-part application of the U.S. patent application Ser. Nos. 61,814 filed on Aug. 6, 1970, which is a streamlined continuation of Ser. No. 783,201 filed Dec. 12, 1968, and 797,010 filed on Feb. 6, 1969. All three of these patent cases are now abandoned.

BACKGROUND OF THE INVENTION

1. Field of the Invention

The present invention generally relates to voltage regulators and particularly to those for maintaining the terminal voltage of a storage battery used in a vehicle at a predetermined value by interrupting the field current of a storage battery charging generator using transistors, the charging generator being driven by the engine of the vehicle.

2. Description of the Prior Art

The conventional charging voltage regulator for a storage battery used in a vehicle comprises a storage battery charging generator, a voltage divider connected across the storage battery to produce a voltage representative of the terminal voltage of the storage battery, a voltage detector responsive to the voltage from the voltage divider and two switching transistors. One of the transistors (pre-stage transistor) is connected with the voltage detector and is so arranged as to drive the other one of the transistors (post-stage transistor) which serves to control the operation of the storage battery charging generator. The collector of the post-stage transistor is connected to one of the poles of the storage battery and is therefore separate from the voltage divider circuit.

In the conventional regulator of the type as briefly explained above, unexpected breakage of or disconnection in the electric circuit for the regulator resulted in serious problems. It is possible that disconnection takes place in the electric circuit for the regulator of a vehicle if, for example, the vehicle has long been used so far. Occurrence of disconnection particularly in the circuit paths between the storage battery and the voltage divider and between the storage battery and the generator brought about the overcharge of the storage battery and/or the burning of electric components of the charging voltage regulator.

SUMMARY OF THE INVENTION

The major object of the present invention is to provide a charging voltage regulator for a storage battery used in a vehicle free from the above-mentioned difficulties.

According to an aspect of the present invention, in a charging voltage regulator for a storage battery of the type having a transistor circuit adapted to be responsive to the output of a Zener diode, which is for detecting the terminal voltage of the storage battery, in order to control the field current of the storage battery charging generator, a diode is provided between one of the terminals of the storage battery and a voltage dividing resistance means which means supplies a pre-stage transistor in the transistor circuit with a base current through the Zener diode, and further a plurality of diodes are provided between the positive output terminal of the generator and the junction of the voltage dividing resistance means and the first-mentioned diode, the connection of said plurality of diodes being such that they conduct with such a sense as to transfer the base current to the pre-stage transistor from the storage battery.

The present invention, therefore, can provide such significant advantages that even when the input terminal of the transistor circuit or the positive output terminal of the charging generator is disconnected from the storage battery by accident, the overcharge of the storage battery and/or burning of the electric parts of the voltage regulator and of other electrical equipment associated with the regulator can be prevented due to conduction of the plurality of diodes effected upon occurrence of such disconnection. It should be noted that said plurality of diodes are, under normal conditions, i.e., when disconnection does not take place, non-conductive and that provision of the plurality of diodes never affects a predetermined voltage level from which the charging operation of the generator should be started under abnormal conditions (i.e., when disconnection takes place) because the diodes have small forward resistances.

BRIEF DESCRIPTION OF THE DRAWINGS

Throughout the figures, similar components are denoted by corresponding reference numerals.

DESCRIPTION OF THE PREFERRED EMBODIMENTS

Figure 1:
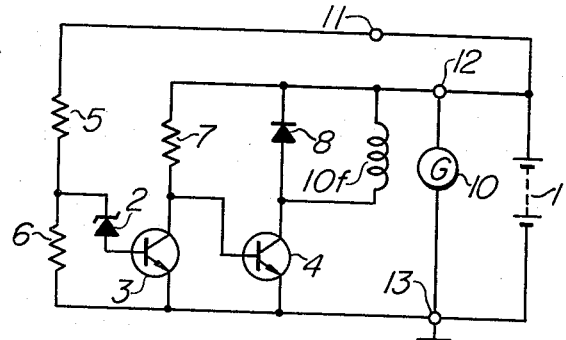
FIG. 1 is a wiring diagram of the conventional battery charging voltage regulation system.

Referring first to FIG. 1 in which an electric wiring diagram of a typical charging voltage regulator conventionally employed for a battery used in a vehicle is shown, there is provided a Zener diode 2 in the first stage of an amplifier circuit consisting of a pre-stage transistor 3 of NPN type and a post-stage transistor 4 of NPN type so that the Zener diode 2 may detect the terminal voltage of a battery 1 by way of a voltage dividing circuit consisting of resistors 5 and 6 and connected across the battery 1, and in the subsequent stage of the amplifier circuit, a parallel connection of a field winding 10f of a storage battery charging generator 10 and a diode 8 for absorbing the counter electromotive force induced in the field winding 10f, whereby the switching operation of the two transistors 3 and 4 is performed to interrupt the field current of the generator 10 to maintain the terminal voltage of the storage battery 1 at a predetermined value.

However, in the conventional circuit of FIG. 1, if the voltage dividing resistors 5 and 6 are disconnected from the positive pole of the storage battery 1, for example, a junction terminal 11 between the resistor 5 and the positive terminal of the storage battery 1 is unexpectedly opened by accident, then it becomes impossible to supply the transistor 3 with the base current regardless of the terminal voltage of the storage battery 1, which causes the pre-stage transistor 3 to be always non-conductive and therefore causes the post-stage transistor 4 to be always conductive. As a result, the field current continues to flow through the field winding 10f of the generator 10 without control and it becomes impossible to suppress the output of the generator, so that the storage battery 1 is overcharged and/or the voltage regulator or some other electric parts associated with the regulator are burnt due to overcurrent therethrough. Also, if the positive terminal of the generator 10 is disconnected from the positive terminal of the storage battery 1, for example, due to breakage of a conductor or blowing of a fuse (not shown), burning of the transistor 3 or transistor 4 and some other electric parts associated with the regulator would occur as in the case mentioned above where the voltage dividing resistors 5 and 6 are disconnected from the storage battery 1. These have been serious problems encountered with the conventional charging voltage regulator.

Reference will next be made to an embodiment of the present invention in connection with the circuit shown in FIG. 2 which is free from the above-mentioned problems. Reference numeral 1 represents a storage battery; 2, a Zener diode for detecting the terminal voltage of the storage battery 1; 3 and 4, a pre-stage transistor of NPN type and a post-stage transistor of NPN type for effecting switching action in cooperation with the Zener diode 2, constituting an amplifier circuit. Reference numerals 5 and 6 represent voltage dividing resistors connected across the storage battery 1 through a diode 15 for dividing the terminal voltage of the storage battery 1; 7, a resistor serving as both a base resistance of the post-stage transistor 4 and a load resistance of the pre-stage transistor 3; 8, a diode placed in the collector circuit of the post-stage transistor 4; 10, a DC generator or an AC generator including a rectifying circuit. Reference numeral 10f is a field winding of the generator 10 and is arranged in parallel with the diode 8 so that the counter electromotive force of the field winding 10f may be neutralized by the diode 8. Reference numerals 11, 12, 13 and 14 are terminals. The terminal 11 is to connect the anode of the diode 15 with the positive terminal of the storage battery 1, while the terminal 12 is to interconnect the amplifier, the positive terminal of the storage battery 1 and the generator 10. Although not shown, usually a switch is provided between the field winding 10f and the positive terminal of the generator 10. The terminal 13 is grounded. The terminal 14 is a common junction of the diode 15, a series connection of diodes 16 and 17 and the voltage dividing resistor 5. It should be noted that the diode 15 is connected between the terminals 11 and 14 and that the series connection of the diodes 16 and 17 is positioned between the terminals 12 and 14, the senses of conduction of the diodes 16 and 17 being the same.

The operation of the charging voltage regulator of FIG. 2 will now be described. When the electrical connections are normal in the whole regulator without any disconnection and breakage, the potential difference between the terminals 12 and 14 is smaller than the activation voltage of the diodes 16 and 17 in their forward current-voltage characteristic curves (i.e., too small for the diodes 16 and 17 to become active or conductive in the forward direction) so that the diodes are non-conductive. Thus, in the normal condition, the voltage regulator is satisfactorily operable as if the diodes 16 and 17 were not provided.

Suppose now that the terminal 11 is disconnected by accident from the positive pole of the storage battery 1. First, the diodes 16 and 17 become conductive, and if the output voltage of the generator 10 does not reach a value high enough to render the Zener diode 2 conductive yet, the pre-stage transistor 3 can not be supplied with base current so that it is in the non-conductive state. Then, the post-stage transistor 4 the base of which is connected to the collector of the pre-stage transistor 3 is made conductive and current flows through the field winding 10f of the generator 10 to produce and increase an output voltage across the generator. As soon as the output reaches a voltage sufficiently high to make the Zener diode 2 conductive, the latter is rendered conductive to allow a base current to flow into the pre-stage transistor 3, which switches the pre-stage transistor 3 from non-conductive to conductive state. Then, the post-stage transistor 4 is switched from conductive to non-conductive state, which cuts off the field current to the generator 10, thus maintaining the terminal voltage of the storage battery 1 at a predetermined value defined by the voltage dividing resistors 5 and 6 and the Zener diode 2. In this case, the output voltage of the generator 10 at which the Zener diode 2 begins to be conductive is equal to that under the normal condition in which the diodes 16 and 17 are non-conductive due to the fact that the small voltage drop across the diodes 16 and 17 in the conductive state under the normal condition is substantially identical with the sum of the voltage drop across the conductor between the terminal 12 and the positive pole of the storage battery 1 and the small voltage drop across the diode 15 in the conductive state under such an abnormal condition as mentioned above. Thus, even if disconnection takes place at the terminal 11, it is possible to place the field current of the generator 10 under such control that alternate conduction and non-conduction of the switching transistors 3 and 4 effect maintenance of the terminal voltage of the storage battery 1 at a predetermined value, preventing occurrence of overcharge of the storage battery 1, burning of the voltage regulator and other electric parts associated with the latter, etc.

If, on the other hand, the terminal 12 is disconnected from the positive terminal of the storage battery 1, the charging circuit from the terminal to the storage battery 1 is completely cut off since the diode 15 is provided between the terminal 14 and the positive pole of the storage battery 1 with the cathode connected to the terminal 14 and with the anode connected to the positive pole of the storage battery 1, thus allowing the terminal voltage of the storage battery 1 to reduce. The generator 10, the field winding 10f of which is disconnected from the storage battery 1, is self-excited by being driven by the engine. When the output voltage of the generator 10 does not increase to a voltage high enough to render the Zener diode 2 conductive, the base current is not fed to the pre-stage transistor 3 making the transistor 3 non-conductive and the post-stage transistor 4 conductive. Then, through the field winding 10f of the generator 10 is flowing a field current to gradually increase the output voltage of the generator 10. Upon arrival of the output voltage of the generator 10 at a voltage high enough to render the Zener diode 2 conductive, a base current is allowed to flow through the Zener diode 2 into the pre-stage transistor 3, which switches the latter from non-conductive to conductive state. Accordingly, the post-stage transistor 4 is switched from conductive to non-conductive state, cutting off the field current to the generator. Thus, the output voltage of the generator 10 is maintained at the predetermined value. Also in this case, the output voltage of the generator 10 at which the Zener diode 2 begins to be conductive is equal to that under the normal condition in which no disconnection occurs for the same reason mentioned above referring to occurrence of a disconnection of the terminal 11 and the positive pole of the storage battery 1. As explained above, even if disconnection takes place between the terminal 12 and the positive terminal of the storage battery 1, it is possible to place the field current of the generator 10 under such control that alternate conduction and non-conduction of the transistors 3 and 4 effect maintenance of the output voltage of the generator 10 at the predetermined value, preventing occurrence of overcharge of the storage battery 1, burning of the voltage regulator, other electric parts associated with the regulator, etc.

Figure 2:
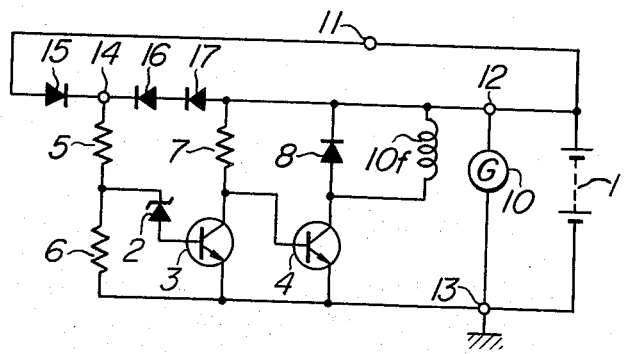
FIG. 2 is a wiring diagram showing an embodiment of the present invention.

In the circuit of FIG. 2, under such an abnormal condition that the terminal 12 is disconnected from the positive pole of the storage battery 1, the diode 15 is so connected as to prevent the charging current from flowing from the positive terminal of the generator 10 to the positive terminal of the storage battery 1 through the diodes 16 and 17 and the terminal 11, the current bearing capacity of the diodes 16 and 17 to be used need not be large. Similarly, the diodes 16 and 17 also serve to prevent collector currents from flowing into the transistors 3 and 4 from the storage battery 1 through the terminal 11 and the diode 15, the current bearing capacity of the diode 15 to be used need not be large.

Figure 3:
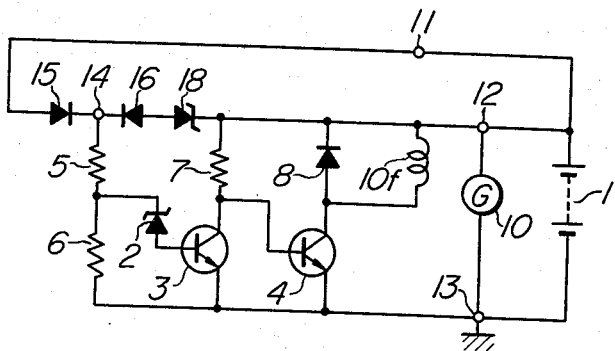
FIG. 3 is a wiring diagram showing another embodiment of the present invention.

Referring to another embodiment of the present invention as shown in FIG. 3, there is provided another Zener diode 18 in place of one of the diodes 16 and 17 (here, diode 17) between the terminals 12 and 14. The Zener diode 18 is, as seen from the figure, series-connected to but with a sense opposite to the diode 16. The breakdown voltage of the Zener diode 18 is so selected as to be lower than that of the detector Zener diode 2. As is now clear to those skilled in the art, the breakdown voltage of the diode 18 corresponds to the activation voltages of the series-connected diodes 16 and 17 between the terminals 12 and 14 of FIG. 2 in the forward current-voltage characteristic curves. Under the normal condition without occurrence of any accidental disconnection, the potential difference between the terminals 12 and 14 is lower than the breakdown voltage of the Zener diode 18 so that they are electrically isolated from each other. The voltage regulator therefore operates as if the diodes 16 and 18 were not provided. Meanwhile, if accidental disconnection takes place either between the terminal 11 and the positive terminal of the storage battery 1 or between the terminal 12 and the positive terminal of the storage battery 1, both of the diodes 16 and 18 are made conductive with a very small voltage drop thereacross and the successive cycle of operation is exactly the same as the embodiment of FIG. 2.

Figure 4:
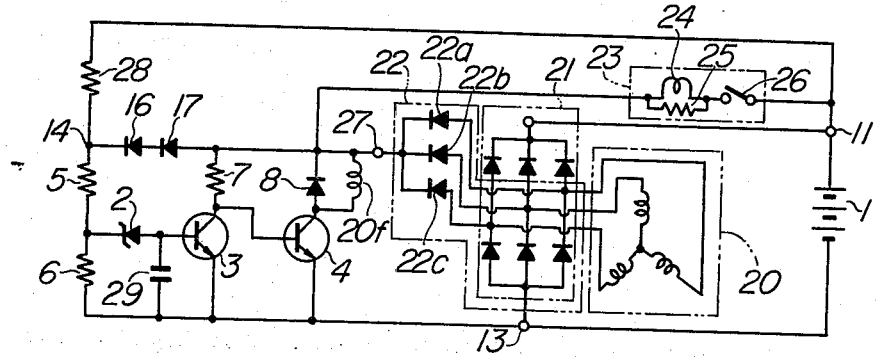
FIG. 4 is a wiring diagram showing a further embodiment of the present invention.

FIG. 4 shows a further embodiment of the present invention which includes an AC generator and rectifiers instead of the DC generator in the previous embodiments and also includes a charge indication lamp unit. However, the essential difference of this embodiment from the previous ones resides in the insertion of a resistor 28 between terminals 11 and 14 instead of the diode 15 in the previous embodiments.

In FIG. 4, reference numeral 20 denotes a three-phase AC generator driven by an internal combustion engine of a vehicle, and 20f a field winding of the three-phase AC generator 20. Reference numeral 21 denotes a rectifying circuit connected across the output terminals of the three-phase AC generator 20 forming a three-phase full-wave rectifying circuit, and 22 an auxiliary rectifying circuit which is constituted by a part of the rectifying circuit 21 and additional diodes 22a, 22b and 22c to form another three-phase full-wave rectifier for energizing a charge indication lamp 24. Reference numeral 23 denotes a charge indication lamp unit consisting of a charge indication lamp 24, a shunt resistance 25 and a switch 26 interlocking with a key-switch for starting the engine. This lamp unit 23 is connected between the positive terminal 27 of the auxiliary rectifying circuit 22 and the positive terminal 11 of the battery 1. Reference numeral 29 denotes a high frequency bypass capacitor. The other components are equal to those shown in FIGS. 1 to 3 with corresponding reference numerals.

Next, the operation of the voltage regulator as shown in FIG. 4 will be explained. When the electrical connections are normal in the charging circuit including the voltage regulator, the potential of the terminal 27 is higher than that of the point 14 by the voltage drops across the resistor 28 and the resistance of the conductor 25, but is lower than the activation voltages of the diodes 16 and 17. Thus, the diodes 16 and 17 are in the open state. Therefore, the voltage regulator is not affected by the existence of said diodes 16 and 17, the terminal voltage of the storage battery 1 being fed back to the input of the field current control transistor circuit and the voltage regulator operating normally. Suppose now that disconnection occurs at a point between the terminal 11 and the resistor 28, the circuit which feeds back the terminal voltage of the storage battery 1 to the transistor 3 will be cut off. Then, the potential of the point 14 drops suddenly so that the voltage between said point 14 and the terminal 27 becomes larger than the activation voltages of the diodes 16 and 17, and the diodes 16 and 17 become conductive. And if the terminal voltage of the charging generator 20 is not high enough to render the Zener diode 2 conductive, the transistor 3 can not be supplied with base current so that the transistor 3 is in the non-conductive state. Accordingly, the transistor 4 is made conductive and a current flows through the field winding 20f of the three-phase AC generator 20 to increase the terminal voltage of said generator 20 by the exciting action of the field winding 20f. As soon as the terminal voltage reaches a voltage sufficiently high to make the Zener diode 2 conductive, the Zener diode is rendered conductive to allow a base current to flow into the transistor 3 from the positive terminal 27 of the auxiliary rectifying circuit 22, then the transistor 3 is switched from non-conductive to conductive state, while the transistor 4 is switched from conductive to non-conductive state. Consequently, the exciting current flowing through the field winding 10f is then cut off.

By repeating the above mentioned operation the voltage regulator controls the output voltage of the three-phase AC generator so as to be a predetermined value and prevents said generator 20 from generating an extraordinary high voltage. Since the potential at the point 14 becomes lower than that of the terminal 27 by a voltage drop across the diodes 16 and 17 in conductive state, by setting the forward voltage drop across the diodes 16 and 17 equal to the voltage drops across the resistor 24, the storage battery can be charged to such a voltage that is given in the case where the electrical connections are normal in the charging means for the storage battery including the voltage regulator.

If, on the other hand, disconnection takes place at a point between the positive terminal of the rectifying circuit 21 and the positive terminal 11 of the storage battery 1, the charging circuit from the charging generator 20 to the storage battery 1 will be cut off. Then, the terminal voltage of the battery 1 decreases gradually. Accordingly, the potential at the point 14 decreases and the voltage across the diodes 16 and 17 increases, which results in conduction of the diodes 16 and 17. Therefore, irrespective of the terminal voltage of the storage battery 1, a base current can be supplied to the transistor 3 in the field current control transistor circuit to detect the terminal voltage of the charging generator 20 with the aid of the diodes 16 and 17, the Zener diode 2 and the dividing resistors 5 and 6. Thus, the transistors 3 and 4 are set conductive or non-conductive according to the terminal voltage of the generator 20 so that the exciting current of the field winding 20f may be interrupted to sustain the terminal voltage of the charging generator 20 at a constant value, and any extraordinary high voltage is not generated across the output terminals of said generator 20. Moreover, at the same time when the diodes 16 and 17 become conductive, an output current of the charging generator 20 begins to flow into the storage battery 1 through the auxiliary rectifying circuit 22, the diodes 16 and 17 and the resistor 28 and in this case the current flowing through said path is limited to several tens to several hundreds mA by said resistor 28. Consequently, burning of the diodes 16, 17 and lead wires due to an excess current does not occur. And the charge indication lamp 24 lights only in the case where the three-phase AC generator 20 does not accomplish its charging function because of the low speed rotation of an engine or when the engine is in high speed rotation but said three-phase AC generator does not accomplish its charging function because of some trouble. In this embodiment two diodes 16 and 17 are inserted between the terminal 27 and the point 14, but it is clear that the same operation of this embodiment shown in FIG. 4 can be obtained even if another Zener diode is substituted for said diodes 16 and/or 17 or is added to them.

It will be clear to those skilled in the art that the present invention is in no way limited to the above-described embodiments but many modifications are possible without departing from the spirit of the present invention as set forth in the appended claims. For example, though in the embodiments NPN type transistors are used, PNP type transistors can be equally used with slight modifications providing similar advantages.

I claim:

1. A charging voltage regulator for use with a storage battery having two terminals, said regulator comprising:
dynamo electric generating means having an output terminal operatively connected to one of said battery terminals for charging said battery at a rate related to an exciting current supplied to a field coil of said dynamo,
voltage dividing means operatively connected at one end thereof to said one terminal of said battery for sensing the terminal voltage thereof and for providing a proportional voltage at a voltage dividing point,
transistor means having an output connected to the field coil of said dynamo and an input connected to said voltage dividing point for controlling said exciting current in relation to an input signal voltage obtained from said dividing point, and
a plurality of diodes operatively connected between the said output terminal of the dynamo and the said one end of said voltage dividing means for providing a control input signal to said transistor means even under adverse circuit conditions thereby preventing excessive dynamo excitation.

2. A voltage regulator as in claim 1 wherein said plurality of diodes includes at least one Zener diode connected with opposite sense as compared to others of said plurality of diodes.

3. A voltage regulator as in claim 1 wherein said operative connection between said voltage dividing means and said battery comprises:

a series connected diode to prevent the flow of reverse current through said operative connection to said battery.

4. A voltage regulator as in claim 1 wherein said operative connection between said voltage dividing means and said battery comprises:

a series connected resistor to provide an auxiliary charging circuit for carrying a limited charging current under adverse circuit conditions when the normal charging circuit is interrupted.

5. A voltage regulator as in claim 1 wherein said dynamo electric generating means comprises a DC generator.

6. A voltage regulator as in claim 1 wherein said dynamo electric generating means comprises an AC alternator and rectifying means connected thereto.

7. A charging voltage regulator for use with a storage battery, said regulator comprising:

dynamo electric generating means for charging said battery at a rate related to an exciting current supplied to a field coil of said dynamo, voltage dividing means operatively connected to said battery for sensing the terminal voltage thereof and providing a proportional voltage at a voltage dividing point, transistor means connected to said dynamo and to said voltage dividing point for controlling said exciting current in relation to an input signal voltage at said dividing point, and circuit means for providing a control signal to said transistor means over a plurality of paths connected between said dynamo and one end of said voltage dividing means, wherein said transistor means is operative even under adverse circuit conditions thereby preventing excessive dynamo excitation.

8. A voltage regulator as in claim 7 wherein said circuit means comprises a plurality of diodes including at least one Zener diode connected with opposite sense as compared to others of said plurality of diodes.

9. A voltage regulator as in claim 7 wherein said operative connection between said voltage dividing means and said battery comprises:

a series connected diode to prevent the flow of reverse current through said operative connection to said battery.

10. A voltage regulator as in claim 7 wherein said dynamo electric generating means comprises a DC generator.

11. A voltage-regulated charging apparatus for use with a storage battery, said apparatus comprising:

an AC generator, a rectifying means connected between said generator and said battery, an auxiliary rectifying means connected to said generator, an indicator lamp connected between said auxiliary rectifying means and said battery, transistor means connected in series with the field winding of said generator, the series connection of said transistor means and the field winding being connected to said auxiliary rectifying means, a voltage dividing means connected to said auxiliary rectifying means through a plurality of diodes, the voltage dividing point of said voltage dividing means being coupled to said transistor means for controlling the conductivity of said transistor means in relation to the voltage at said voltage dividing point, and a resistor connected between the junction of said dividing means and said plurality of diodes and the battery.

12. An improvement for use with a voltage-regulated dynamo charging apparatus for a storage battery wherein a voltage dividing means is used to sense the terminal voltage of said battery with the voltage at the dividing point of said dividing means being used to control a means for regulating the dynamo output and wherein a plurality of diodes are connected to said voltage dividing means for conducting current from said dynamo to said means for regulating under adverse circuit conditions, the improvement comprising:

a resistor connected between the junction of said dividing means and said plurality of diodes and the battery to provide an auxiliary charging circuit for carrying a limited charging current under adverse circuit conditions when the normal charging circuit is interrupted.

* * * * *